(12) United States Patent
Zhang et al.

(10) Patent No.: US 12,248,327 B1
(45) Date of Patent: Mar. 11, 2025

(54) METHOD FOR UAV PATH PLANNING IN URBAN AIRSPACE BASED ON SAFE REINFORCEMENT LEARNING

(71) Applicant: Beihang University, Beijing (CN)

(72) Inventors: Xuejun Zhang, Beijing (CN); Yan Li, Beijing (CN); Yuanjun Zhu, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/556,353

(22) PCT Filed: Feb. 23, 2023

(86) PCT No.: PCT/CN2023/077843
§ 371 (c)(1),
(2) Date: Oct. 20, 2023

(87) PCT Pub. No.: WO2024/164367
PCT Pub. Date: Aug. 15, 2024

(30) Foreign Application Priority Data

Feb. 8, 2023 (CN) .......................... 202310081273.2

(51) Int. Cl.
*G05D 1/622* (2024.01)
*G05D 1/46* (2024.01)
*G05D 1/49* (2024.01)

(52) U.S. Cl.
CPC ............... *G05D 1/637* (2024.01); *G05D 1/46* (2024.01); *G05D 1/49* (2024.01)

(58) Field of Classification Search
CPC ............ G05D 1/637; G05D 1/49; G05D 1/46
See application file for complete search history.

(56) References Cited

U.S. PATENT DOCUMENTS 11,992,945 B2 *  5/2024  Tan ........................ G06N 3/006
2018/0308371 A1  10/2018  Cao et al.
(Continued)

FOREIGN PATENT DOCUMENTS

| CN | 113589842 | 11/2021 |
| CN | 113625733 | 11/2021 |

(Continued)

OTHER PUBLICATIONS

English translation of International Search Report for PCT/CN2023/077843 issued on Oct. 7, 2023.

*Primary Examiner* — Matthew J. Reda
(74) *Attorney, Agent, or Firm* — NZ Carr Law Office

(57) ABSTRACT

The present invention discloses a method for UAV path planning in urban airspace based on a safe reinforcement learning (RL) algorithm called shield-DDPG, which combines a shield model with a DDPG algorithm and pertains to the field of UAV technologies. The method takes an attractive force from the destination point into account when an action is selected, which improves the convergence speed of the algorithm and also improve the efficiency of UAV path planning. More importantly, the method provided by the present invention can effectively verify safety of an action in terms of the air collision risk and the ground impact risk, and ensure that a final output of the algorithm is a safe optimal solution. Therefore, the present invention can effectively solve the problem that when the RL algorithm is used for UAV path planning, it is difficult to ensure the safety of the learning or execution process due to the lack of hard constraints.

5 Claims, 2 Drawing Sheets

(56) References Cited

U.S. PATENT DOCUMENTS

| | | | |
|---|---|---|---|
| 2022/0014963 A1* | 1/2022 | Yeh | G06N 7/01 |
| 2022/0143819 A1* | 5/2022 | Tan | G06N 3/006 |

FOREIGN PATENT DOCUMENTS

| | | |
|---|---|---|
| CN | 114355980 | 4/2022 |
| CN | 115562345 | 1/2023 |

* cited by examiner

US 12,248,327 B1

METHOD FOR UAV PATH PLANNING IN URBAN AIRSPACE BASED ON SAFE REINFORCEMENT LEARNING

TECHNICAL FIELD

The present invention pertains to the field of unmanned aerial vehicle (UAV) technologies, and in particular relates to a method for UAV path planning in urban airspace based on safe reinforcement learning.

BACKGROUND OF THE INVENTION

In recent years, the unmanned aircraft system (UAS, hereinafter also referred to as "UAV") technology has been on a boom and widely used in military and civil fields. In military, the UAV technology is mainly used in networked and information-based battlefields, while in civilian, the UAV technology is of great significance to remote sensing and mapping, logistics distribution, geological survey, disaster relief, epidemic protection, etc. Although UAV's flight missions may vary, it is necessary to always plan a safe path from a start point to a destination point, thus ensuring successful completion of the UAV's missions.

Especially, an urban air mobility (UAM) has gradually come into focus as the use of UAVs continues to expand in the field of transportation. As to speak, the UAM has become an inevitable trend for the development of an intelligent transportation system in the future. However, the entry of the UAV into urban airspace for operation may pose a huge safety hazard to public security. Therefore, it is of great research significance to operation and application of the UAV in urban airspace to seek an efficient and reliable UAV path planning method that can enable the UAV to efficiently avoid obstacles such as urban buildings and infrastructures while ensuring, to the maximum extent, minimization and acceptability of risks posed by UAV's flights to urban people on the ground. From the current research, it can be seen that the commonly used UAV path planning methods can be mainly divided into the following four categories according to properties of algorithms: linear programming algorithms, graph search algorithms, intelligent optimization algorithms and reinforcement learning algorithms.

The linear programming algorithms, represented by mixed integer linear programming (MILP), are relatively simple and efficient in computation, but cannot quickly deal with the problem of a large number of decision variables. The graph search algorithms, represented by the Dijkstra algorithm, the A* algorithm, the rapidly exploring random tree (RRT) algorithm, etc., are more suitable for solving the shortest path planning problem, but less practical in urban scenarios, and their efficiency decrease as the number of nodes traversed by the algorithms increases. The intelligent optimization algorithms, represented by the particle swarm optimization (PSO) algorithm, the ant colony (ACO) algorithm and the genetic algorithm (GA), are widespread and convenient for parallel processing, but are prone to fall into local-optimum in some complex situations.

In addition, the reinforcement learning (RL) algorithms, represented by the deep Q-network (DQN) algorithm and the deep deterministic policy gradient (DDPG) algorithm, are increasingly applied to UAV path planning. In such algorithms, the UAV interacts with the environment to obtain the optimal action, so as to maximize the long-term return, and hence such algorithms are highly versatile. However, due to defects of their own principles, it is difficult for such algorithms to guarantee the safety of a final algorithm output with a mathematically proven solution. For operation of the UAV in urban airspace, its safety is a priority, so targeted improvements to such algorithms are required.

SUMMARY OF THE INVENTION

In view of this, considering the complexity of an urban airspace, an objective of the present invention is to provide a safe reinforcement learning algorithm called shield-DDPG for UAV path planning, which can realize a safe and reliable verification of a UAV path planning instruction and guarantee the safety of a planned UAV path by avoiding air collision risks and ground impact risks as far as possible, and at the same time, can effectively cope with the problem of uncertainty of a solution in a general reinforcement learning algorithm.

To fulfill the above-mentioned objective, the present invention provides the following technical solutions.

The present invention provides a method for UAV path planning in urban airspace based on safe reinforcement learning. The method includes:

S1, collecting state information of a UAV, urban airspace and an urban ground environment, and defining a state of the UAV at any moment t as $s_t$, wherein $s_t = [x_t, y_t, z_t]$;

S2, constituting a safe reinforcement learning algorithm called shield-DDPG architecture by four functional modules: an environment module, a neural network module, a shield module, and a replay buffer; and conducting training by the neural network module according to the state $s_t$, the neural network module including a main network and a target network; the shield module being constructed by a linear temporal logic and specifically including a finite-state reactive system, a state trace, a safety specification, a Markov decision process, a safety automaton and an observe function, the shield module acting between a main actor network and a main critic network, the main actor network outputting an action $u_t$;

S3, determining, by the shield module, safety of an action $a_t = u_t + f_t = [a_t^x, a_t^y, a_t^x]$, in which $f_t = \varepsilon \cdot D_t^P$ is an attractive force, $\varepsilon$ is an attractive coefficient, and $D_t^P$ is a distance between a UAV current position and a destination point;

S4, verifying the safety of the action $a_t$ by the shield module, and finally outputting a safe action $a_t'$;

S5, by the final safe action $a_t'$ obtained, performing $a_t'$ for state transition to obtain a next state $s_{t+1}$ as well as a reward $Reward_t$; and S6, storing the current state $s_t$, the final safe action $a_t'$, the reward $Reward_t$, the next state $s_{t+1}$, and a training flag $d_t$ in the replay buffer, and sampling a random mini-batch of transitions from the replay buffer for updating the neural network.

Further, the finite-state reactive system is $M=(S,\Theta,L)$, in which S is a set of n states, i.e., $S=[s_t]_{t=1}^n$, in which L represents an observed label and $\Theta$ represents a state transition function; as for the specification $\Phi$, all state traces in the reactive system M should satisfy all properties of $\Phi$, and the state traces are safety-constrained when $\Phi$ is defined as a safety specification $\Phi^{safe}$ that satisfies all safety properties; the observe function $f: S \times E \rightarrow l = \{D_t^{O_i}, Risk_t\}$ is defined as mapping between the state S and an environment E and output as a distance $D_t^{O_i}$ between the UAV and each obstacle and a ground impact risk $Risk_t$ when the UAV falls out of control; and a describing function $\otimes$ indicating that an action a is performed at the state s is defined as:

$$s \otimes a = \begin{cases} 1, \text{if } \{(z_{t+1} > H_{O_i}) \| (D_{t+1}^{O_i} > R_{O_i})\} \cap (\text{Risk}_{t+1} < \text{Risk}_{max}) = 1 \\ 0, \text{if } (D_{t+1}^{O_i} \le R_{O_i}) \| (\text{Risk}_{t+1} \ge \text{Risk}_{max}) = 1 \end{cases},$$

where t and t+1 and represent a moment t and a moment t+1 respectively, $\text{Risk}_{max}$ refers to a maximum acceptable target level of safety from the ground impact, $\text{Risk}_{min}$ refers to a minimum negligible risk from the ground impact, and $R_{O_i}$ and $H_{O_i}$ are a radius and a height of an $i^{th}$ static obstacle respectively; and the state transition function $\Theta$ is expressed as:

$$\Theta(s, (l, a)) = \begin{cases} 1, \text{if } s \otimes a = 1 \\ 0, \text{if } s \otimes a = 0 \end{cases}.$$

A safe state is obtained when $\Theta(s,(l,a))$ is output as 1, and an unsafe state is obtained when $\Theta(s,(l,a))$ is output as 0. The action is considered a safe action $a_t'$ if all safety properties are satisfied, and the shield module needs to generate a safe action $a_t'$ if the safety properties are not satisfied.

Further, generating the final safe action $a_t'$ by the shield module specifically includes: first, determining which specific UAV action dimension or dimensions cause(s) an unsafe condition, i.e., except for the dimension to be determined, setting an action in the other two dimensions to be 0, executing a state transition process with the action in the dimension to be determined, calculating and determining whether the action is safe or not at this time, and in a similar fashion, obtaining the unsafe action dimension(s) through separate judgment of all the dimensions; then, keeping an action in the safe dimension unchanged, and as for the unsafe dimension, circularly compressing the original unsafe action for j times by a specific step, $\xi$, and judging the action obtained by each compression again; and assuming that m actions in the j actions meet the safety specification, executing the state transition process of the m actions, calculating the reward, and selecting the action with the largest reward as the final safe action $a_t'$.

Further, the final safe action $a_t'$ is performed for state transition to obtain the next state $s_{t+1}$ and the reward $\text{Reward}_t$, wherein one time of the state transition process is expressed as $s_{t+1} \leftarrow s_t + \Delta_t \cdot a_t'$, a reward function $\text{Reward}_t$ is calculated from, $\text{Reward}_t = r_1 \text{Reward}_{t1} + r_2 \text{Reward}_{t2} + r_3 \text{Reward}_{t3}$, in which $r_1$, $r_2$ and $r_3$ are coefficients of reward subfunctions respectively, $\theta_i$ is a reward value correspondingly further applied to the UAV, and $\text{Reward}_{t1}$ is a reward function for evaluating the distance between the UAV current position and the destination point, $$\text{Reward}_{t1} = \begin{cases} -\dfrac{D_t^D}{D_{total}}, \text{if } D_t^D > \lambda \\ -\dfrac{D_t^D}{D_{total}} + \vartheta_1, \text{if } D_t^D \le \lambda \end{cases},$$

where $D_{total}$ is a distance between a start point and a destination point, $\lambda$ is a constant for judging whether the UAV is close enough to the destination point, and $D_t^D$ is the distance between the UAV current position and the destination point;

$\text{Reward}_{t2}$ is a reward function for evaluating an air collision risk between the UAV and each static obstacle, $$\text{Reward}_{t2} = \begin{cases} -\sum_{i=1}^{N} \dfrac{R_{O_i} + WC}{D_t^{O_i}}, \text{if } \exists\, D_t^{O_i}, R_{O_i} < D_t^{O_i} < R_{O_i} + WC \\ -\sum_{i=1}^{N} \dfrac{R_{O_i} + WC}{D_t^{O_i}} + \vartheta_2, \text{if } (z_t > H_{O_i}) \text{ or } (\forall\, D_t^{O_i}, D_t^{O_i} \ge R_{O_i} + WC) \end{cases},$$

where WC is an acceptable operation safety separation threshold between the UAV and the obstacle; and
$\text{Reward}_{t3}$ is a reward function for evaluating a ground impact risk when the UAV falls out of control, $$\text{Reward}_{t3} = \begin{cases} -\dfrac{\text{Risk}_t}{\text{Risk}_{max}}, \text{if } \text{Risk}_{min} < \text{Risk}_t < \text{Risk}_{max} \\ -\dfrac{\text{Risk}_t}{\text{Risk}_{max}} + \vartheta_3, \text{if } R_t \le \text{Risk}_{min} \end{cases}.$$

Further, in step S6, a random minibatch of B transitions $(s_i, a_i', \text{Reward}_i, s_{i+1}, d_i)$ is sampled from the replay buffer, and $y_i = \text{Reward}_i + \gamma Q'(s_{i+1}, \mu'(s_{i+1}|\theta^{\mu'})|\theta^{Q'})$ is set, wherein $\gamma$ is a discount factor. The parameter $\theta^Q$ of the main critic network is updated by minimizing a loss:

$$L = \frac{1}{B} \sum_i (y_i - Q(s_i, a_i'|\theta^Q))^2.$$

The main actor policy $\theta_\mu$ is updated by using sampled policy gradient descent:

$$\nabla_{\theta^\mu} J \approx \frac{1}{B} \sum_i \nabla_a Q(s, a'|\theta^Q)\bigg|_{s=s_i, a'=\mu(s_i)} \nabla_{\theta^\mu} \mu(s|\theta^\mu)\bigg|_{s_i}$$

Afterwards, the target network is updated by soft update:

$\theta^{Q'} = \tau \theta^Q + (1-\tau)\theta^{Q'}$, $\theta^{\mu'} = \tau \theta^\mu + (1-\tau)\theta^{\mu'}$, in which $\tau$ is a soft update coefficient.

The present invention has the following beneficial effects.

The UAV path planning method provided by the present invention can quickly respond to meet mission planning requirements, while taking a full account of complexity of an urban airspace and UAV operation risks. The method can enable the UAV to safely and efficiently avoid obstacles such as urban buildings and infrastructures, and can ensure acceptability of risks posed by UAV's flights to urban people on the ground, thereby better ensuring the UAV operation safety in urban airspace.

Specifically, in terms of method, the present invention provides a safe reinforcement learning algorithm called shield-DDPG, which combines a shield model with a DDPG algorithm. The method takes an attractive force from the destination point into account when an action is selected, which improves the convergence speed of the algorithm and also improve the efficiency of UAV path planning. More importantly, the method provided by the present invention can effectively verify safety of an action in terms of the air collision risk and the ground impact risk, and ensure that a final output of the algorithm is a safe optimal solution. Therefore, the present invention can effectively solve the problem that when the RL algorithm is used for UAV path planning, it is difficult to ensure the safety of the learning or execution process due to the lack of hard constraints.

Other advantages, objectives and characteristics of the present invention will be set forth in the subsequent description, and will be apparent to those skilled in the art to some extent, or may be taught by those skilled in the art from practice of the present invention. The objectives and other advantages of the present invention can be realized and obtained by the following description.

BRIEF DESCRIPTION OF DRAWINGS

For clearer objectives, technical solutions and beneficial effects of the present invention, the present invention is illustrated by providing the following drawings.

DETAILED DESCRIPTION

Figure 1:
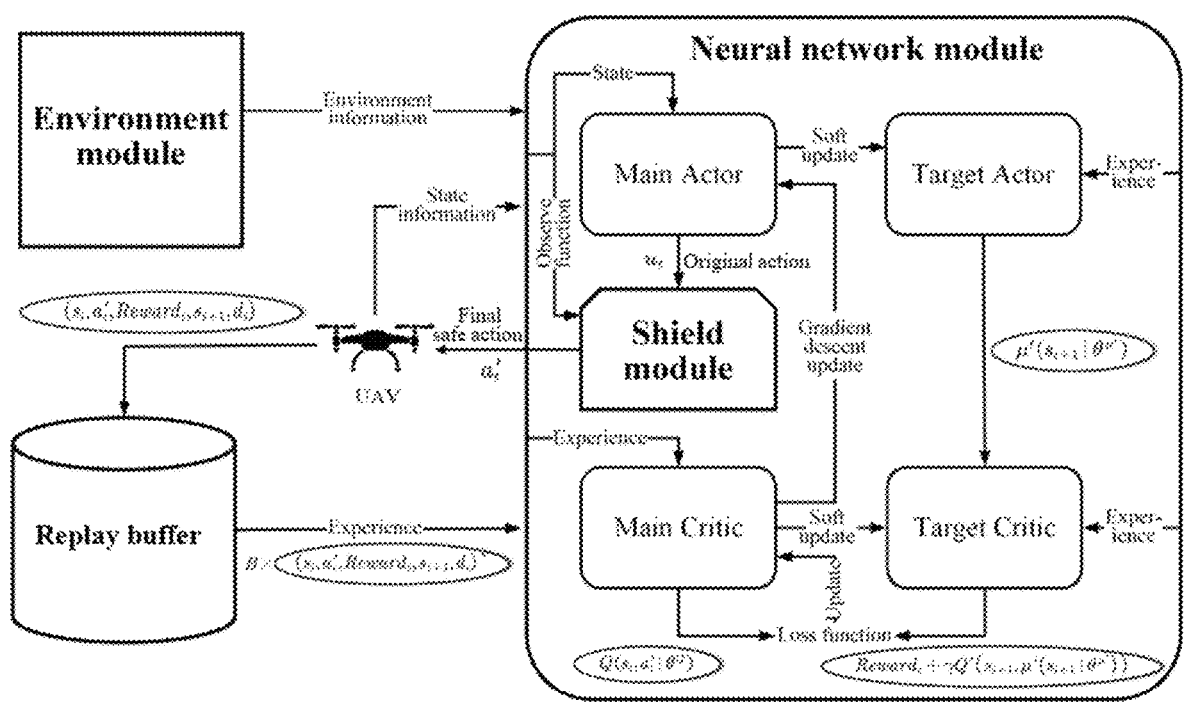
FIG. 1 is a schematic of the shield-DDPG algorithm.
Figure 2:
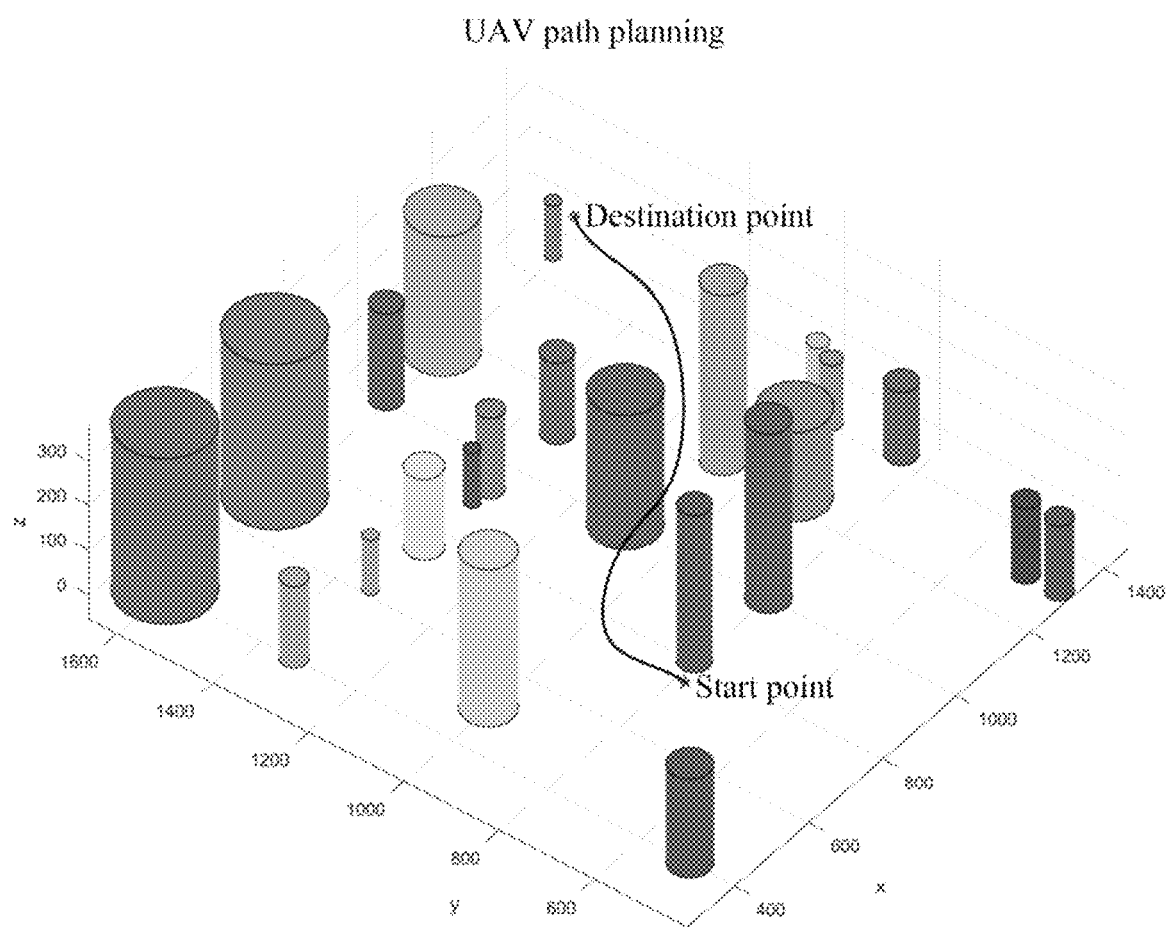
FIG. 2 is an exemplary diagram of simulation results of UAV path planning.

As shown in FIGS. 1-2, the shield-DDPG algorithm architecture provided by the present invention consists of four functional modules: an environment module, a neural network module, a shield module and a replay buffer. The environment module is mainly configured to acquire and collect state information of a UAV, airspace and an urban ground environment. The neural network module consists of two parts: a main network and a target network, and each of these two networks contains a set of actor-critic neural network structure. In the present invention, a pytorch framework is adopted to build the neural network. The shield module acts between the main actor network and the main critic network, and is mainly configured to detect safety of an action generated by the main actor network and generate and output a new safe action under unsafe conditions. The replay buffer is mainly used to store the experiences during the training process to update the neural network. The schematic diagram of the composition architecture of the algorithm is shown in FIG. 1, and detailed description and process introduction of the algorithm will be made below with reference to FIG. 1.

Specifically, the environment module is mainly configured to acquire the UAV position and mission planning requirements, as well as the target urban airspace environment (mainly referring to state information of airspace and a ground area of an urban target area). The UAV position and mission planning requirements mainly include a three-dimensional position state $s_t=[x_t,y_t,z_t]$ of the UAV at a current moment t, a position state $s_s=[x_s,y_s,z_s]$ of the start point, and a position state $s_D=[x_D,y_D,z_D]$ of the destination point. The target urban airspace environment mainly covers static obstacles such as no-fly-zones, urban buildings and infrastructures (communication stations and towers), which are equivalent to N cylindrical static obstacles. Taking an $i^{th}$ obstacle $O_i$ as an example, its position state is $s_{O_i}=[x_{O_i},y_{O_i},R_{O_i},H_{O_i}]$ in which $1 \le i \le N$, and $(x_{O_i},y_{O_i})$, is a ground circle center coordinate of the cylindrical obstacle $O_i$ and $R_{O_i}$ and $H_{O_i}$ are a radius and a height of the cylindrical obstacle $O_i$ respectively. Meanwhile, a ground impact risk $Risk_t$ when the UAV falls out of control at any state point $s_t$ mainly refers to a risk of fatalities from impact with ground population, which is mainly associated with an operation state and the out-of-control falling probability of the UAV, density distribution of ground population, the area of the impacted ground, exposure of ground population, etc. In the present invention, it is believed that the ground impact risk $Risk_t$ is known.

Specifically, the shield module is based on linear temporal logic (LTL). The shield module constructed in this invention refers to a protection framework for preventing the algorithm from outputting an unsafe action. The framework consists of a finite-state reactive system, a state trace, a safety specification, a Markov decision process (MDP), a safety automaton and an observe function.

Specifically, the shield module performs formal modeling of UAV path planning by using the finite-state reactive system $M=(S,\Theta,L)$ and state traces commonly used in the linear temporal logic, and constrains the state traces by the safety specification $\Phi^{safe}$. Then, the safety specification and a Markov process of UAV path planning are transformed into two safety automaton models respectively. Afterwards, a state reactive system that can realize these two safety automaton models at the same time is constructed, and the state reaction system is a prototype of the shield module. After that, the observe function $f:S \times E \to l=\{D_t^{O_i}, Risk_t\}$ is employed to assist in evaluating safety of the action.

For the reactive system M, S represents the state, $\Theta$ represents the state transition function, and L represents the observed label. For the specification, $\Phi$, all the state traces in the reactive system M should satisfy all properties of $\Phi$. When $\Phi$ is defined as a safety specification $\Phi^{safe}$ that satisfies all the safety properties, the state traces can be safely constrained. The observe function $f$ is defined as the mapping between the state S and an environment E. In this example, its output is the distance $D_t^{O_i}$ between the UAV and each obstacle and a ground impact risk $Risk_t$ when the UAV falls out of control.

In the present invention, a describing function $\otimes$ indicating that the action a is performed at the state s is defined as:

$$s \otimes a = \begin{cases} 1, \text{ if } \{(z_{t+1} > H_{O_i}) \| (D_{t+1}^{O_i} > R_O)\} \cap (Risk_{t+1} < Risk_{max}) = 1 \\ 0, \text{ if } \{(D_{t+1}^{O_i} \le R_{O_i}) \| (Risk_{t+1} \ge Risk_{max}) = 1 \end{cases}$$

The state transition function may be expressed as:

$$\Theta(s,(l,a)) = \begin{cases} 1, \text{ if } s \otimes a = 1 \\ 0, \text{ if } s \otimes a = 0. \end{cases}$$

A safe state is obtained when $\Theta(s,(l,a))$ is output as 1, and an unsafe state is obtained when $\Theta(s,(l,a))$ is output as 0, which are specifically illustrated as below.

For the UAV and the $i^{th}$ obstacle $O_i$, whether a xOy plane where the UAV is located intersects with the cylindrical obstacle $O_i$ is determined first. If there is no intersection, it is believed that the UAV may not collide with the obstacle $O_i$ at the current position, i.e., $z_t > H_{O_i}$, and no collision may occur; and when $x_t \le H_{O_i}$, the distance $D_t^{O_i} = \sqrt{(x_t-x_{O_i})^2+(y_t-y_{O_i})^2}$ between the UAV and each obstacle $O_i$ is defined, and it is necessary to judge whether a collision may occur or not by comparing $D_t^{O_i}$ with $R_{O_i}$.

Particularly, in the present invention, an acceptable operation safety separation threshold WC between the UAV and the obstacle is drawn into consideration. The safety separation threshold mainly takes into account the UAV's own performance parameters, operation speed, the actual urban airspace, communication and other factors. This parameter reflects the ability to maintain an adequate safe distance interval and avoid an air collision risk between the UAV and the static obstacle. In the present invention, a specific explanation is made as below:

when $D_t^{O_i} \leq R_{O_i}$, it is believed that there may be an air collision between the UAV and the static obstacle $O_i$, and at this time, an unsafe state is obtained, and $\Theta(s,(l,a))=0$;

when $R_{O_i}<D_t^{O_i}<R_{O_i}+WC$, it is believed that although there may be no collision between the UAV and the static obstacle $O_i$, the air collision risk still possibly exists, however, it is still in a safe state at this time, and $\Theta(s,(l,a))=1$; and when $z_t>H_{O_i}$ or $D_t^{O_i} \geq R_{O_i}+WC$, it is believed that there may be no air collision between the UAV and the static obstacle $O_i$, and the air collision risk is negligible, thus, it is in a safe state at this time, and $\Theta(s,(l,a))=1$.

Meanwhile, it is necessary to consider whether the ground impact risk when the UAV falls out of control is within an acceptable target level of safety, which is specifically described as below:

when $Risk_t \geq Risk_{max}$, it is believed that the current state is an unsafe state, and $\Theta(s,(l,a))=0$;

when $Risk_{min}<Risk_t<Risk_{max}$, it is believed that the current state is a safe state, but there is still a certain degree of ground impact risk, and $\Theta(s,(l,a))=1$; and when $Risk_t \leq Risk_{min}$, it is believed that the current state is a safe state, the ground impact risk is negligible, and $\Theta(s,(l,a))=1$.

$Risk_{max}$ refers to a maximum acceptable target level of safety from the ground impact, taking casualties per hour as an evaluation index. At present, it is generally believed that $1 \times 10^{-8}$ persons/hour is the maximum acceptable target level of safety; and $Risk_{min}$ refers to a minimum negligible risk from the ground impact, and in the present invention, $1 \times 10^{-11}$ persons/hour is considered the minimum negligible risk.

Based on the shield module and combined with deep deterministic strategy gradient algorithm, the present invention proposes a safe reinforcement learning algorithm called shield-DDPG for UAV path planning, which is specifically described as below.

Before training begins, a state space and an action space are designed in advance with reference to the UAV position and mission planning requirements, as well as the target urban airspace environment.

At the beginning of training, first, the parameters $\theta^Q$ and $\theta^\mu$ of the critic network $Q(s,a|\theta^Q)$ and the actor network $\mu(s/\theta^\mu)$ in the main network are initialized by using a random number, and parameters of the main network are copied to the target network (parameters of the target network are distinguished with $\theta^{Q'}$ and $\theta^{\mu'}$). Meanwhile, the replay buffer is initialized.

The state of the UAV at any moment t is defined as $s_t$, and a set of n states in the whole process may be expressed as $S=[s_t]_{t=1}^n$.

For any state $s_t$ of the UAV, the actor network may obtain an action $u_t=\mu(s_t|\theta^\mu)+\mathcal{N}_{t,t}$ at the state $s_t$ according to an action selection policy $\mu$ and randomly explored noise $\mathcal{N}_{t,t}$. Here, the explored noise $\mathcal{N}_{t,t}$ is introduced mainly to avoid inadequacy of an output action caused by the fact that the neural network has only one output with the given input, and it is unnecessary to add this noise in the test process after training. Noise used in the present invention is Ornstein-Uhlenbeck (OU) noise. Meanwhile, in order to accelerate convergence of the algorithm and avoid falling into local-optimum, target airspace is abstracted as a virtual artificial potential field. In consideration that the destination point has an attractive force $f_t=\varepsilon \cdot D_t^D$ to the UAV (in which $\varepsilon$ is an attractive coefficient, and $D_t^D$ is the distance between the UAV current position and the destination point), the action of which the safety is to be determined by the shield module is $a_t=u_t+f_t=[a_t^x,a_t^y,a_t^z]$.

Afterwards, the shield module verifies the safety of the action $a_t$, and finally outputs a safe action $a_t'$, which is described in detail as below:

The shield module executes the state transition process under the action $a_t$, and evaluates the value of $\Theta(s,(l,a_t))$. If all safety properties are satisfied, the action is considered as a safe action $a_t'$, and if not, the shield module needs to generate a safe action $a_t'$.

Specifically, when generating the safe action $a_t'$, the shield module needs to first determine which specific UAV action dimension or dimensions cause(s) an unsafe condition, i.e., except for the dimension to be determined, to set an action in the other two dimensions to be 0, to execute a state transition process with the action in the dimension to be determined, to calculate and determine whether the action is safe or not at this time, and in a similar fashion, to obtain the unsafe action dimension(s) through separate judgment of all the dimensions. Then, an action in the safe dimension is kept unchanged, and as for the unsafe dimension, the original unsafe action is circularly compressed for j times by a specific step $\tau$. The action obtained by each compression is judged again. Assuming that m actions in the j actions meet the safety specification, the state transition process of the m actions is executed, the reward is calculated, and the action with the largest reward is selected as the final safe action $a_t'$.

The final safe action $a_t'$ is performed for state transition to obtain the next state $s_{t+1}$ and the reward $Reward_t$. One time of the state transition process may be expressed as $s_{t+1} \leftarrow s_t + \Delta t \cdot a_t'$.

Specifically, the reward function $Reward_t$ is calculated from:

$$Reward_t = r_1 Reward_{t1} + r_2 Reward_{t2} + r_3 Reward_{t3}.$$

$Reward_{t1}$ mainly takes the distance between the UAV current position and the destination point into account, and the closer the UAV is to the destination point, the larger the value of the reward function $Reward_{t1}$ is; $Reward_{t2}$ mainly takes the air collision risk between the UAV and each static obstacle into account, the smaller the total risk is, the larger the value of the reward function $Reward_{t2}$ is; and $Reward_{t3}$ mainly takes the ground impact risk when the UAV falls out of control into account, the smaller the risk is, the larger the value of the reward function $Reward_{t3}$ is. $r_1$, $r_2$ and $r_3$ are coefficients of reward subfunctions respectively. For each reward function, $\theta_i$ is a reward value correspondingly further applied to the UAV when a certain condition is met.

First, the reward function $Reward_{t1}$ is intended to evaluate the distance between the UAV current position and the destination point. In the case that the UAV is close enough to the destination point, it is believed in the present invention that an additional reward needs to be applied when the distance between the UAV current position and the destination point is less than a specified threshold $\lambda$, which is specifically described as:

$$Reward_{t1} = \begin{cases} -\dfrac{D_t^D}{D_{total}}, & \text{if } D_t^D > \lambda \\ -\dfrac{D_t^D}{D_{total}} + \vartheta_1, & \text{if } D_t^D \leq \lambda \end{cases},$$

where $D_{total}$ is the distance between the start point and the destination point, and $\lambda$ is a constant for judging whether the UAV is close enough to the destination point.

Second, the reward function $Reward_{t2}$ is intended to evaluate the air collision risk between the UAV and each static obstacle. In the case that the air collision risk between the UAV and each static obstacle $O_i$ is negligible, it is believed in the present invention that when any static obstacle $O_i$ meets $z_t > H_{O_i}$ or $D_t^{O_i} \geq R_{O_i} + WC$, an additional reward needs to be applied, which is specifically described as:

$$Reward_{t2} = \begin{cases} -\sum_{i=1}^{N} \frac{R_{O_i}+WC}{D_t^{O_i}}, \text{ if } \exists D_t^{O_i}, R_{O_i} < D_t^{O_i} < R_{O_i}+WC \\ -\sum_{i=1}^{N} \frac{R_{O_i}+WC}{D_t^{O_i}} + \vartheta_2, \text{ if } (z_t > H_{O_i}) \text{ or } (\forall D_t^{O_i}, D_t^{O_i} \geq R_{O_i}+WC) \end{cases}$$

Third, the reward function $Reward_{t3}$ is intended to evaluate the ground impact risk when the UAV falls out of control. The ground impact risk when the UAV falls out of control is negligible when it is less than the minimum negligible risk. It is believed in the present invention that an additional reward needs to be applied when $Risk_t \leq Risk_{min}$, which is specifically described as:

$$Reward_{t3} = \begin{cases} -\frac{Risk_t}{Risk_{max}}, \text{ if } Risk_{min} < Risk_t < Risk_{max} \\ -\frac{Risk_t}{Risk_{max}} + \vartheta_3, \text{ if } R_t \leq Risk_{min} \end{cases}$$

Then, the current state, the safe action, the reward, the next state and a training flag $(s_t, a_t', Reward_t, s_{t+1}, d_t)$ are stored in the replay buffer, in which $d_t$ is the flag to judge whether the current training step is the last step. Applying the training flag $d_t$ to the algorithm is a common method to constraint the training steps in one episode and to prevent an infinite loop, and the specific judgment method is determined according to an actual mission requirement. In the present invention, two judgment methods are provided for double constraints of the training steps:

1) it is believed that training can be stopped when the distance between the UAV and the destination point is less than a threshold required by the mission, and $d_t=1$ at this time, otherwise, $d_t=0$; and
2) a maximum training step may be specified during each time of training, it is believed that training can be stopped till the current step is the maximum step, and $d_t=1$ at this time, otherwise, $d_t=0$.

After that, a random minibatch of B transitions $(s_i, a_i', Reward_i, s_{i+1}, d_i)$ is sampled from the replay buffer, and $y_i = Reward_i + \gamma Q'(s_{i+1}|\theta^{\mu'})|\theta^{Q'})$ is set, in which $\gamma$ is a discount factor.

Then, the parameter $\theta^Q$ of the main critic network is updated by minimizing the loss:

$$L = \frac{1}{B}\sum_i (y_i - Q(s_i, a_i'|\theta^Q))^2,$$

The main actor policy $\theta^\mu$ is updated by using sampled policy gradient descent:

$$\nabla_{\theta^\mu} J \approx \frac{1}{B}\sum_i \nabla_a Q(s, a'|\theta^Q)\Big|_{s=s_i, a'=\mu(s_i)} \nabla_{\theta^\mu} \mu(s|\theta^\mu)\Big|_{s_i},$$

Afterwards, the target network is updated by soft update:

$$\theta^{Q'} = \tau\theta^Q + (1-\tau)\theta^{Q'},$$

$$\theta^{\mu'} = \tau\theta^\mu + (1-\tau)\theta^{\mu'},$$

in which $\tau$ is a soft update coefficient.

After completing model construction of the above-mentioned shield-DDPG algorithm, it is necessary to test and output a model, and the test-completed and output model is adopted to generate a recommended path for the UAV.

Specifically, after the model of the shield-DDPG algorithm meets an end-of-training condition and satisfies the requirement for convergence, parameters of the model can be exported for a model test described in the next step; otherwise, the model is retrained. The requirement for convergence is that the paths output for 10 consecutive times meet mission planning requirements, and the reward is maintained at a high level without an obvious change.

Then, after the model meets the requirements in the above step, an output effect of the model should be tested. Specifically, the model parameters exported in the above step are imported into a new python environment, and an interference $\epsilon \in [0,1]$ is introduced to the start point under mission planning requirements. The path is planned for 500 times consecutively by the model. If the probability of the path meeting the requirements reaches 99%, it is believed that the model meets the requirements; otherwise, the model is retained.

After that, the trained model of the shield-DDPG algorithm is deployed on a UAV path planning system as required, by which a UAV operation path is planned.

It is worth noting that the model of the shield-DDPG algorithm for UAV path planning, provided by the present invention, is developed in the python environment by using a pytorch framework, but it also has excellent compatibility on an engineering platform developed based on C++.

Meanwhile, since the model of the shield-DDPG algorithm in the present invention uses the pytorch framework, the exported model data is generally of a .pt file structure. If the four neural networks are all DNN of 4*256 structure, the size of the trained model is about 500 kb, which can improve the reading rate and effectively reduce the memory usage.

Tests show that the method for UAV path planning in urban airspace based on the shield-DDPG algorithm, provided by the present invention, can effectively improve the safety and efficiency of UAV path planning, and an example of simulation results of the planned UAV path is shown in FIG. 2.

The present invention provides a safety reinforcement learning algorithm called shield-DDPG for UAV path planning, which can avoid an air collision risk and a ground impact risk as much as possible while ensuring fast response to a UAV mission requirement, and realize a safe and reliable verification of a UAV path planning instruction, thereby effectively ensuring the safety of a planned path and effectively solving the problem of uncertainty in a solution of a general reinforcement learning algorithm. The shield module constructed in this invention is used to ensure the safety of the learning or execution process throughout the training period, and the algorithm converges quickly.

Finally, the above preferred embodiments are intended only to illustrate the technical solutions of the present invention but not to limit it. Although the present invention has been described in detail by means of the above preferred embodiments, it should be understood by those skilled in the art that various formal or detailed changes can be made without departing from the scope defined by the claims of the present invention.

The invention claimed is:

1. A method for UAV path planning in urban airspace based on safe reinforcement learning, comprising:
S1, collecting state information of a UAV, urban airspace and an urban ground environment, and defining a state of the UAV at any moment t as $s_t$, wherein $s_t=[x_t,y_t,z_t]$;
S2, constituting a safe reinforcement learning algorithm called shield-DDPG architecture by four functional modules: an environment module, a neural network module, a shield module, and a replay buffer; and conducting training by the neural network module according to the state $s_t$, the neural network module comprising a main network and a target network; the shield module being constructed by a linear temporal logic and specifically comprising a finite-state reactive system, a state trace, a safety specification, a Markov decision process, a safety automaton and an observe function, the shield module acting between a main actor network and a main critic network, the main actor network outputting an action $u_t$;
S3, determining, by the shield module, safety of an action $a_t=u_t+f_t=[a_t^x,a_t^y,a_t^z]$, in which $f_t=\varepsilon \cdot D_t^D$ is an attractive force, $\varepsilon$ is an attractive coefficient, and $D_t^D$ is a distance between a UAV current position and a destination point;
S4, verifying the safety of the action $a_t$ by the shield module, and finally outputting a safe action $a_t'$;
S5, by the final safe action $a_t'$ obtained, performing $a_t'$ for state transition to obtain a next state $s_{t+1}$ as well as a reward $Reward_t$; and
S6, storing the current state $s_t$, the final safe action $a_t'$, the reward $Reward_t$, the next state $s_{t+1}$, and a training flag $d_t$ in the replay buffer, and sampling a random mini-batch of transitions from the replay buffer for updating the neural network.

2. The method for UAV path planning in urban airspace based on safe reinforcement learning according to claim 1, wherein the finite-state reactive system is $M=(S,\Theta,L)$, in which S is a set of n states, i.e., $S=[s_t]_{t=1}^n$, in which L represents an observed label and $\Theta$ represents a state transition function; as for the specification $\Phi$, all state traces in the reactive system M should satisfy all properties of $\Phi$, and the state traces are safety-constrained when $\Phi$ is defined as a safety specification $\Phi^{safe}$ that satisfies all safety properties; the observe function $f:S \times E \rightarrow l=\{D_t^{O_i},Risk_t\}$ is defined as mapping between the state S and an environment E and output as a distance $D_t^{O_i}$ between the UAV and each obstacle and a ground impact risk $Risk_t$ when the UAV falls out of control; and a describing function $\otimes$ indicating that an action a is performed at the state s is defined as:

$$s \otimes a = \begin{cases} 1, \text{if } \{(z_{t+1} > H_{O_i}) \| (D_{t+1}^{O_i} > R_O)\} \cap (Risk_{t+1} < Risk_{max}) = 1 \\ 0, \text{if } \{(D_{t+1}^{O_i} \leq R_{O_i}) \| (Risk_{t+1} \geq Risk_{max}) = 1 \end{cases},$$

where t and t+1 represent a moment t and a moment t+1 respectively, $Risk_{max}$ refers to a maximum acceptable target level of safety from the ground impact, $Risk_{min}$ refers to a minimum negligible risk from the ground impact, and $R_{O_i}$ and $H_{O_i}$ are a radius and a height of an $i^{th}$ static obstacle respectively; and the state transition function $\Theta$ is expressed as:

$$\Theta(s, (l, a)) = \begin{cases} 1, \text{if } s \otimes a = 1 \\ 0, \text{if } s \otimes a = 0 \end{cases},$$

a safe state is obtained when $\Theta(s,(l,a))$ is output as 1, and an unsafe state is obtained when $\Theta(s,(l,a))$ is output as 0, the action is considered a safe action $a_t'$ if all safety properties are satisfied, and the shield module needs to generate a safe action $a_t'$ if the safety properties are not satisfied.

3. The method for UAV path planning in urban airspace based on safe reinforcement learning according to claim 2, wherein generating the safe action $a_t'$ by the shield module specifically comprises: first, determining which specific UAV action dimension or dimensions cause(s) an unsafe condition, i.e., except for the dimension to be determined, setting an action in the other two dimensions to be 0, executing a state transition process with the action in the dimension to be determined, calculating and determining whether the action is safe or not at this time, and in a similar fashion, obtaining the unsafe action dimension(s) through separate judgment of all the dimensions; then, keeping an action in the safe dimension unchanged, and as for the unsafe dimension, circularly compressing the original unsafe action for j times by a specific step $\xi$, and judging the action obtained by each compression again; and assuming that m actions in the j actions meet the safety specification, executing the state transition process of the m actions, calculating the reward, and selecting the action with the largest reward as the final safe action $a_t'$.

4. The method for UAV path planning in urban airspace based on safe reinforcement learning according to claim 3, wherein the final safe action $a_t'$ is performed for state transition to obtain the next state $s_{t+1}$ and the reward $Reward_t$, wherein one time of the state transition process is expressed as $s_{t+1} \leftarrow s_t + \Delta t \cdot a_t'$, a reward function $Reward_t$ is calculated from $Reward_t = r_1 Reward_{t1} + r_2 Reward_{t2} + r_3 Reward_{t3}$, in which $r_1$, $r_2$ and $r_3$ are coefficients of reward subfunctions respectively, $\theta_i$ is a reward value correspondingly further applied to the UAV, and $Reward_{t1}$ is a reward function for evaluating the distance between the UAV current position and the destination point, $$Reward_{t1} = \begin{cases} -\dfrac{D_t^D}{D_{total}}, \text{if } D_t^D > \lambda \\ -\dfrac{D_t^D}{D_{total}} + \vartheta_1, \text{if } D_t^D \leq \lambda \end{cases},$$

where $D_{total}$ is a distance between a start point and a destination point, $\lambda$ is a constant for judging whether the UAV is close enough to the destination point, and $D_t^D$ is the distance between the UAV current position and the destination point;
$Reward_{t2}$ is a reward function for evaluating an air collision risk between the UAV and each static obstacle, $$Reward_{t2} = \begin{cases} -\sum_{i=1}^{N} \frac{R_{O_i}+WC}{D_t^{O_i}}, \text{ if } \exists D_t^{O_i}, R_{O_i} < D_t^{O_i} < R_{O_i}+WC \\ -\sum_{i=1}^{N} \frac{R_{O_i}+WC}{D_t^{O_i}} + \vartheta_2, \text{ if } (z_t > H_{O_i}) \text{ or } (\forall D_t^{O_i}, D_t^{O_i} \geq R_{O_i}+WC) \end{cases},$$

where WC is an acceptable operation safety separation threshold between the UAV and the obstacle; and
$Reward_{t3}$ is a reward function for evaluating a ground impact risk when the UAV falls out of control, $$Reward_{t3} = \begin{cases} -\frac{Risk_t}{Risk_{max}}, \text{ if } Risk_{min} < Risk_t < Risk_{max} \\ -\frac{Risk_t}{Risk_{max}} + \vartheta_3, \text{ if } R_t \leq Risk_{min} \end{cases}.$$

5. The method for UAV path planning in urban airspace based on safe reinforcement learning according to claim 4, wherein in step S6, a random minibatch of B transitions $(s_i, a_i', Reward_i, s_{i+1}, d_i)$ is sampled from the replay buffer, and $y_i = Reward_i + \gamma Q'(s_{i+1}, \mu'(s_{i+1}|\theta^{\mu'})|\theta^{Q'})$ is set, wherein $\gamma$ is a discount factor, and the parameter $\theta^Q$ of the main critic network is updated by minimizing a loss:

$$L = \frac{1}{B}\sum_i (y_i - Q(s_i, a_i'|\theta^Q))^2,$$

the main actor policy $\theta^\mu$ is updated by using sampled policy gradient descent:

$$\nabla_{\theta^\mu} J \approx \frac{1}{B}\sum_i \nabla_a Q(s, a'|\theta^Q)\bigg|_{s=s_i, a'=\mu(s_i)} \nabla_{\theta^\mu} \mu(s|\theta^\mu)\bigg|_{s_i},$$

afterwards, the target network is updated by soft update:

$$\theta^{Q'} = \tau\theta^Q + (1-\tau)\theta^{Q'},$$

$$\theta^{\mu'} = \tau\theta^\mu + (1-\tau)\theta^{\mu'},$$

where $\tau$ is a soft update coefficient.

\* \* \* \* \*